(12) United States Patent
Lopez et al.

(10) Patent No.: US 7,672,520 B2
(45) Date of Patent: Mar. 2, 2010

(54) METHOD AND DEVICE FOR CODING AND DECODING A SEQUENCE OF IMAGES

(75) Inventors: Patrick Lopez, Livre sur Changeon (FR); Gwenaelle Marquant, Liffre (FR); Edouard Francois, Bourg des Comptes (FR)

(73) Assignee: Thomson Licensing, Boulogne-Billancourt (FR)

( * ) Notice: Subject to any disclaimer, the term of this patent is extended or adjusted under 35 U.S.C. 154(b) by 957 days.

(21) Appl. No.: 11/437,495

(22) Filed: May 19, 2006

(65) Prior Publication Data

US 2006/0274958 A1    Dec. 7, 2006

(30) Foreign Application Priority Data

Jun. 6, 2005    (FR)    ................................... 05 05732

(51) Int. Cl.
*G06K 9/36* (2006.01)
(52) U.S. Cl. ....................... 382/232; 382/251; 382/166; 375/240.11; 348/420; 348/472; 348/409
(58) Field of Classification Search ............. 375/240.11
See application file for complete search history.

(56) References Cited

U.S. PATENT DOCUMENTS

| 5,301,018 | A * | 4/1994 | Smidth et al. | 375/240.24 |
|---|---|---|---|---|
| 6,021,249 | A * | 2/2000 | Kitamura | 386/33 |
| 6,181,872 | B1 * | 1/2001 | Yamane et al. | 386/112 |
| 6,587,588 | B1 * | 7/2003 | Bottou et al. | 382/240 |
| 7,076,104 | B1 * | 7/2006 | Keith et al. | 382/233 |
| 2004/0170335 | A1 * | 9/2004 | Pearlman et al. | 382/240 |
| 2006/0274958 | A1 * | 12/2006 | Lopez et al. | 382/240 |
| 2008/0063385 | A1 * | 3/2008 | Oshima et al. | 386/125 |

OTHER PUBLICATIONS

Search Report Dated Feb. 7, 2006.
Benetiere M. et al. "Scalable compression of 3d medical datasets using a (2D+T) wavelet video coding scheme" Signal Processing and Its Applications, sixth international, symposium on. Aug. 16, 2001, Piscataway, NJ, USA, IEEE, vol. 2, 16 aoQt 2001 (Aug. 16, 2001), pp. 537-540, XP010557106 ISBN: 0-7803-6703-0 *p. 538-p. 539, alineas 2,3* figures 1-4*.
Taubamn D. Ed—Institute of Electrical and Electronics Engineers: "Remote browsing of JPEG2000 images" Proceedings 2002 International Conference on Image Processing. ICIP 2002. Rochester, NY, Sep. 22-25, 2002, International Conference on Image Processing, New York, NY: IEEE, US, vol. vol. 2 of 3, Sep. 22, 2002, pp. 229-232, XP010607302 ISBN: 0-7803-7622-6 *p. 229-pp. 231, alines 2-4* figure 2*.

* cited by examiner

*Primary Examiner*—Anand Bhatnagar
*Assistant Examiner*—Avinash Yentrapati
(74) *Attorney, Agent, or Firm*—Robert D. Shedd; Paul P. Kiel; Guy H. Eriksen

(57) ABSTRACT

The invention relates to a method for coding N+1 images comprising a step of temporal analysis of these images generating a low-frequency image and N high-frequency images. It furthermore comprises the following steps:
dividing each of the N+1 low-frequency and high-frequency images into N+1 parts;
interleaving the N+1 low-frequency and high-frequency images so as to generate N+1 interleaved images and so that the N+1 parts of the low-frequency image are distributed between the N+1 interleaved images, each of the N+1 interleaved images comprising a single part of the low-frequency image; and
coding the N+1 interleaved images independently of one another, each of the interleaved images being coded with one and the same number of bits.

12 Claims, 7 Drawing Sheets

| L3 | | H1 | | H2 | | H3 | |
|---|---|---|---|---|---|---|---|
| L3_NW | L3_NE | H1_NW | H1_NE | H2_NW | H2_NE | H3_NW | H3_NE |
| L3_SW | L3_SE | H1_SW | H1_SE | H2_SW | H2_SE | H3_SW | H3_SE |

FIG.7

| $I_1$ | | $I_2$ | | $I_3$ | | $I_4$ | |
|---|---|---|---|---|---|---|---|
| L3_NW | H1_NE | H2_NW | L3_NE | H3_NW | H3_NE | H1_NW | H2_NE |
| H1_SW | H1_SE | H2_SW | H2_SE | L3_SW | H3_SE | H3_SW | L3_SE |

FIG.8

| $I_1$ | | $I_2$ | | $I_3$ | | $I_4$ | |
|---|---|---|---|---|---|---|---|
| L3_NW | H1_NE | H1_NW | L3_NE | H2_NW | H3_NE | H3_NW | H2_NE |
| H2_SW | H3_SE | H3_SW | H2_SE | L3_SW | H1_SE | H1_SW | L3_SE |

FIG.9

| L_W | L_E | H_W | H_E |
|---|---|---|---|

METHOD AND DEVICE FOR CODING AND DECODING A SEQUENCE OF IMAGES

This application claims the benefit, under 35 U.S.C. §119, of French Patent Application No. 0505732 filed 6 Jun. 2005.

1. FIELD OF THE INVENTION

The invention relates to a method and a device for coding and decoding a sequence of images using a method (respectively a device) for coding and decoding fixed images.

2. STATE OF THE ART

In most of the methods for coding image sequences, such as MPEG or methods based on a t+2D wavelet scheme (i.e. using a step of temporal analysis t and a step of 2D spatial analysis), a first step of temporal analysis makes it possible to reduce the temporal redundancy between successive images and a second step of spatial analysis makes it possible to reduce the spatial redundancy. Such a method is illustrated by FIG. 1. Each image of the sequence comprises one or more components, for example a luminance component and two chrominance components. Prior to the coding, the sequence of images, called source images, is generally divided into groups of pictures (GOP) or groups of frames (GOF) referenced $GOF_1$, $GOF_2$, and $GOF_3$ in FIG. 2. Step 10 of the coding method consists of a temporal analysis of the sequence possibly motion-compensated, for example by motion-compensated temporal filtering ("MCTF") so as to obtain various temporal frequency bands or else by prediction as is the case in the coding schemes based on the MPEG2 standard defined in the document ISO/IEC 13818-2 (entitled "Information technology—Generic coding of moving pictures and associated audio information: Video"). This step is generally applied independently to each of the components of the image. The motion compensation uses motion vectors (MV) provided by a motion estimation step 11. This step can, for example, implement a conventional estimation by block matching. These vectors are used so as to reduce the amount of information to be transmitted when the position of an object moves from one image to the next in the sequence. The images resulting from this temporal analysis are thereafter coded during a step 17. This step generally comprises a step 12 of spatial analysis making it possible to reduce the spatial redundancy by for example using a discrete cosine transform ("DCT") or a discrete wavelet transform ("DWT") and a step 13 of entropy coding making it possible to code the spatio-temporal coefficients thus obtained. During a multiplexing step 15, the motion data previously coded during a step 14 are combined with the coded data relating to the spatio-temporal coefficients so as to create a single data stream. In the case where step 13 of entropy coding does not make it possible to adapt the number of bits used to code each image, all the images of the sequence are then coded with the same number of bits. The impossibility of adapting the number of bits used to code each image has the effect of decreasing the quality of reconstruction of the sequence after decoding. For certain applications (for example, digital cinema) requiring a high quality of reconstruction, this degradation is not tolerable.

3. SUMMARY OF THE INVENTION

The invention has the aim of alleviating at least one of these drawbacks. In particular it makes it possible to improve the quality of reconstruction of the images when the coding method (respectively device) requires that each image be coded with one and the same number of bits.

For this purpose, the invention relates to a method for coding N+1 images comprising at least one component. The method comprising a step of temporal analysis of said N+1 images generating, for each component, a low-frequency image and N high-frequency images. It furthermore comprises the following steps:

dividing, for each component, each of the N+1 low-frequency and high-frequency images into N+1 parts;

interleaving, for each component, the N+1 low-frequency and high-frequency images so as to generate a sequence of N+1 interleaved images and so that the N+1 parts of the low-frequency image are distributed between the N+1 interleaved images, each of the N+1 interleaved images comprising a single part of the low-frequency image; and coding, for each component, the N+1 interleaved images independently of one another, each of the interleaved images being coded with one and the same number of bits.

Preferably, the coding step is based on the JPEG2000 coding standard.

Advantageously, the step of temporal analysis consists of a motion-compensated temporal filtering.

Preferably, the temporal filtering uses a filter belonging to the group of filters comprising:

the filter of Haar type; and the filter of Daubechies 5-7 type.

Advantageously, the method is applied successively to at least two groups of N+1 images, each of the images being divided into N+1 parts separated by M boundaries. Each of the M boundaries is displaced in a given spatial direction between the at least two groups of images.

According to a particular characteristic, N is equal to 1 and M is equal to 1.

Preferably, at the start of each of the groups of images the boundary is displaced, within a predefined displacement window, by a constant number of pixels and in that if the boundary exits the displacement window, the boundary is displaced to a predetermined position of the displacement window.

The invention also relates to a method for decoding images coded according to the coding method according to the invention, the coded images arising in the form of a data stream. The decoding method comprises the following steps:

decoding the stream or a part of the stream so as to generate, for each component, N+1 interleaved images;

de-interleaving, for each component, the N+1 interleaved images so as to generate a low-frequency image and N high-frequency images; and performing a temporal synthesis of the N+1 low-frequency and high-frequency images so as to generate N+1 decoded images.

The invention relates furthermore to a coding device for coding N+1 images comprising at least one component, the device comprising a module for temporal analysis of said N+1 images generating, for each component, a low-frequency image and N high-frequency images. It furthermore comprises:

a processing module for dividing, for each component, each of the N+1 low-frequency and high-frequency images into N+1 parts and interleaving the N+1 low-frequency and high-frequency images so as to generate a sequence of N+1 interleaved images and so that the N+1 parts of the low-frequency image are distributed between the N+1 interleaved images, each of the N+1 interleaved images comprising a single part of the low-frequency image; and at least one coding module for coding, for each component, the N+1 interleaved images independently of one another, each of the interleaved images being coded with one and the same number of bits.

According to a preferred embodiment, the at least one coding module is an image coder based on the JPEG2000 standard.

The invention also relates to a decoding device for decoding images coded with the coding device according to the invention, the coded images arising in the form of a data stream. This device comprises:

a module for decoding the stream or of a part of the stream so as to generate, for each component, N+1 interleaved images;

a module for processing the N+1 interleaved images so as to generate a low-frequency image and N high-frequency images; and a module for temporal synthesis of the N+1 low-frequency and high-frequency images so as to generate N+1 decoded images.

4. LISTS OF FIGURES

The invention will be better understood and illustrated by means of wholly non-limiting advantageous exemplary embodiments and modes of implementation, with reference to the appended figures in which:

FIG. 6 illustrates a partitioning into quadrants of the low-frequency and high-frequency images resulting from a temporal analysis in the case of a GOF of 4 images;

FIG. 7 illustrates an interleaving of the quadrants of the low-frequency and high-frequency images resulting from a temporal analysis in the case of a GOF of 4 images;

FIG. 8 illustrates an interleaving of the quadrants of the low-frequency and high-frequency images resulting from a temporal analysis of 4 images according to another embodiment;

FIG. 9 illustrates a partitioning into two parts of the low-frequency and high-frequency images resulting from a temporal analysis in the case of a GOF of 2 images;

5. DETAILED DESCRIPTION OF THE INVENTION

Figure 1:
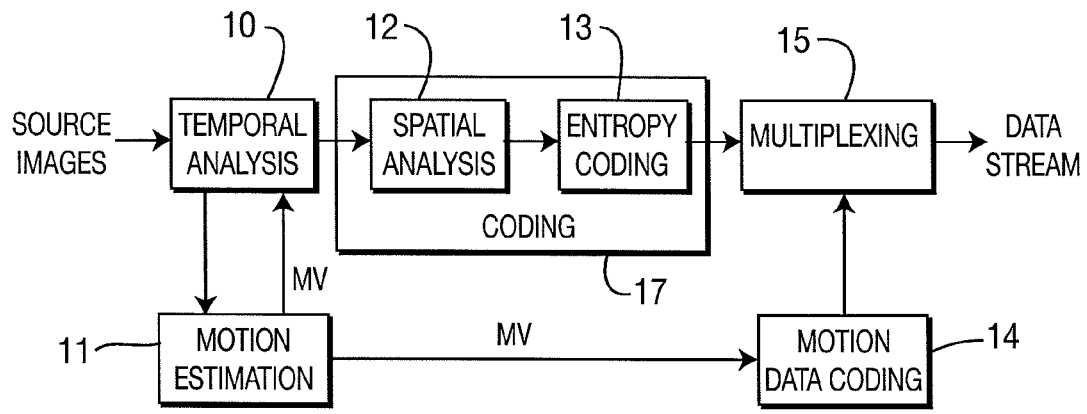
FIG. 1 illustrates a coding method according to the state of the art.
Figure 2:
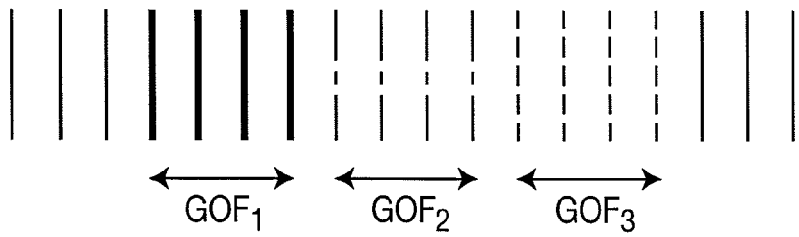
FIG. 2 illustrates the structure in groups of images (GOF) of a sequence of images according to the state of the art.
Figure 3:
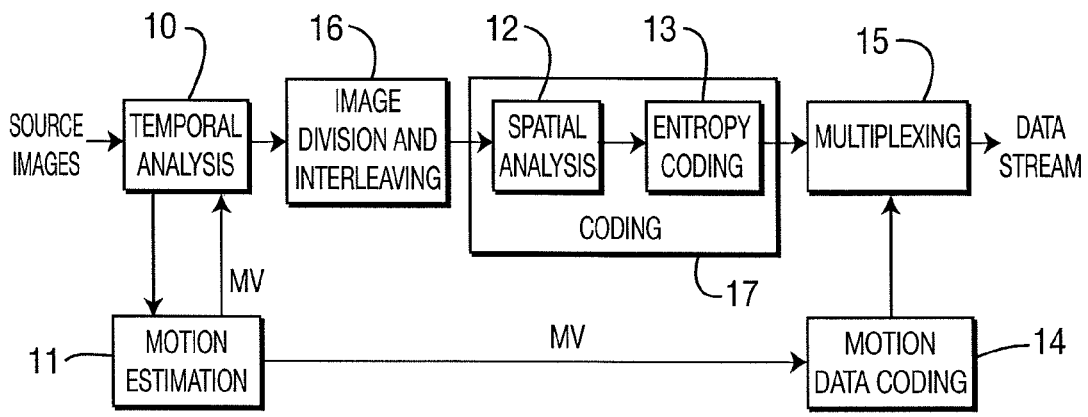
FIG. 3 illustrates a coding method according to the invention.

The invention relates to a method for coding a sequence of source images generating a data stream and a method for decoding the stream generated by the coding method. A source image comprises one or more components, for example a luminance component Y and two chrominance components U and V. Each component can itself be represented in the form of an image constituting of pixels or image points with each of which is associated a value (for example a value Y of luminance or a value U or V of chrominance). The coding method is illustrated by FIG. 3. The method according to the invention comprises steps similar to the method according to the state of the art illustrated by FIG. 1. These steps bear the same references. Prior to coding, the sequence of source images is generally divided into groups of N+1 images (GOF) such as illustrated in FIG. 2. According to a first embodiment, the sequence is divided into GOFs of 2 images.

Figure 4:
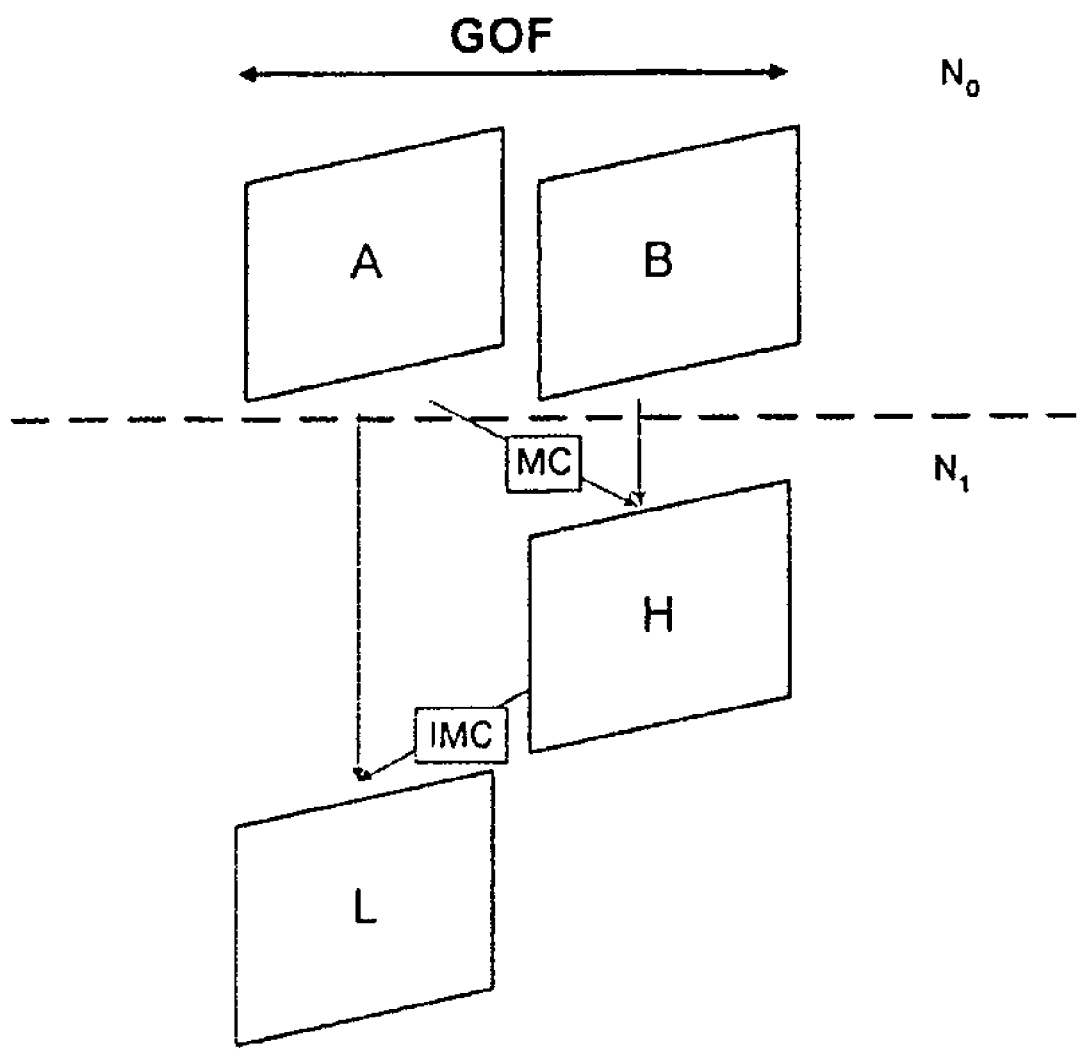
FIG. 4 illustrates a wavelet-based method of temporal analysis of a sequence of images structured as a GOF of 2 images according to the state of the art.
Figure 5:
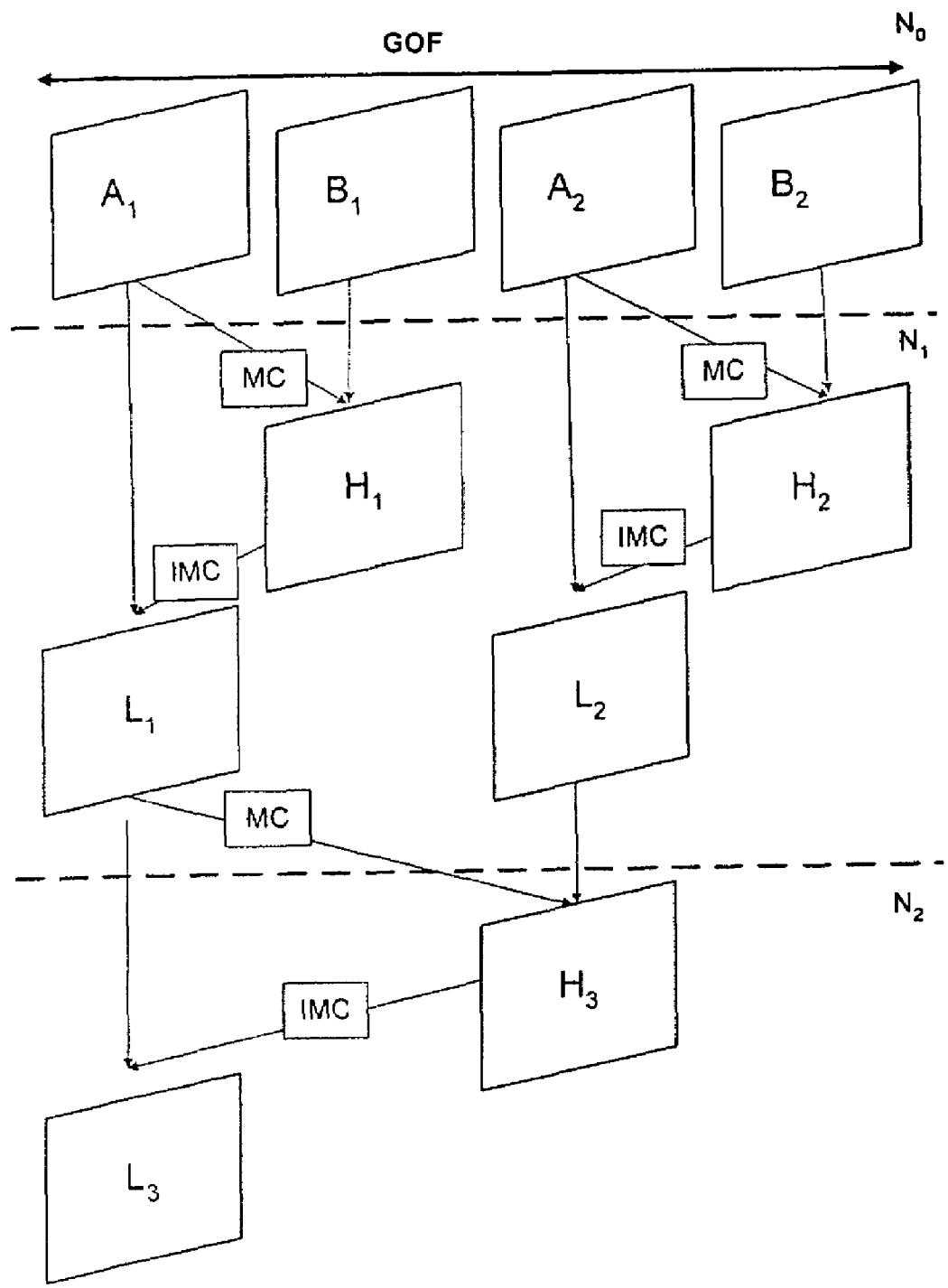
FIG. 5 illustrates a wavelet-based method of temporal analysis of a sequence of images structured as a GOF of 4 images according to the state of the art.

During a step 10, each GOF is analysed temporally for example by using a motion-compensated temporal filtering (MCTF). This step is generally applied independently to each of the components of the image. A non-motion-compensated temporal filtering could also be used. Such a temporal filtering can be performed either by a conventional convolution procedure or else by using a particular procedure, termed a lifting procedure, which comprises a succession of steps of prediction and of updating. The filtering in itself can be based on a wavelet scheme, for example a short filtering scheme of Haar type or long filtering scheme of Daubechies 9-7 type. Generally, as in the spatial domain, the temporal wavelet transform consists of a recursive dyadic filtering on the low frequencies. At a given level of temporal decomposition, a group of $2^p$ images is thus transformed into two groups, respectively of low and high frequency, of $2^{p-1}$ images. The low-frequency images thus obtained are decomposed again according to the same method to obtain a new level of temporal decomposition. FIG. 4 illustrates such a temporal scheme of analysis of a GOF of 2 images referenced A and B by a lifting procedure based on a filtering scheme of Haar type. In this figure, the temporal decomposition is performed on 2 levels: a first level of temporal resolution referenced $N_0$ corresponds to the source images A and B of the sequence, a second resolution level referenced $N_1$ corresponds to high and low-frequency images respectively referenced H and L. The temporal filtering method consists in applying a high-pass filter and a low-pass filter so as to obtain an image H representing the high temporal frequencies and an image L representing the low temporal frequencies. To effect the filterings, a motion field is estimated during a step 11 between each pair of images to be filtered and this is done for each level, for example by an estimator of pel-recursive type or of block matching type. These two filtering steps correspond to the following equations:

$$\begin{cases} H = \dfrac{B - MC_{A \leftarrow B}(A)}{\sqrt{2}} & \text{(prediction step)} \\ L = \sqrt{2} \cdot A + IMC_{A \leftarrow B}(H) & \text{(updating step)} \end{cases}$$

where $MC_{A \leftarrow B}(F)$ corresponds to the motion compensation of an image F and where $IMC_{A \leftarrow B}(H)$ corresponds to a motion "decompensation" of the image H. To obtain the high-frequency image H, the motion field between the images A and B is estimated (motion field from B to A). More precisely, H is obtained by point-wise differencing of the image B and of the motion-compensated image A. Thus, we deduct from a pixel of B a certain value of A, interpolated if appropriate, pointed at by the motion vector calculated during the estimation of the motion from image B to image A. To obtain the low-frequency image L, the motion field between the images B and A is estimated (motion field from A to B). More precisely, the image L is deduced from the image H, by addition of the image A to the inverse motion-compensated image H. Thus, we add, to a pixel of A or more exactly to a normalized value of the luminance of the pixel, a certain value in H, interpolated if appropriate, pointed at by the motion vector calculated during the estimation of the motion from image A to image B. Generally, a single motion field is estimated, for example that from B to A, the other being deduced from the first for example by direct inversion of the first field. In the case of a GOF of size greater than two images, this filtering is applied again to the low-frequency images. More particularly, the method is illustrated in FIG. 5 in the case of a GOF of 4 images referenced $A_1$, $B_1$, $A_2$ and $B_2$. The temporal analysis makes it possible inter alia to obtain 4 images: a low-frequency image referenced $L_3$ and three high-frequency images referenced $H_1$, $H_2$ and $H_3$ corresponding to the various levels of temporal decomposition (N1 and N2). In this figure, the first level of temporal decomposition referenced $N_0$ corresponds to the source images of the sequence, the second level referenced $N_1$ corresponds to the images referenced $L_1$, $L_2$, $H_1$ and $H_2$ and the third level referenced $N_2$ corresponds to the images referenced $L_3$ and $H_3$. The temporal analysis can be extended to a GOF of size greater than 4 in a direct manner by generating additional decomposition levels. As mentioned previously, the temporal filtering method might not use motion compensation. In the case of a GOF of two images, the images H and L are then generated in the following manner:

$$\begin{cases} H = B - A & \text{(prediction step)} \\ L = A + B & \text{(updating step)} \end{cases}$$

When the source image comprises several components (for example Y, U and V), this step is applied independently to each of the components. Thus, in the case of a GOF of two images, step 10 generates an image $L_x$ and an image $H_x$ per component x. Generally the motion vectors estimated on the luminance components are used directly on the chrominance components after a scaling (for example division by two of the components of a motion vector in the case of a 420 format).

During the following step 16, the images obtained in step 10 are divided into several parts separated by boundaries so as to be able to interleave the low-frequency and high-frequency images according to a particular pattern. More precisely, a low-frequency image (for example $L_3$) and N high-frequency images (for example $H_1$, $H_2$ and $H_3$ in the case of a GOF of 4 images) being obtained in step 10, these images are divided into N+1 parts. In the case of a GOF of four images, the four images are divided into quadrants referenced X_NW, X_NE, X_SW and W_SE in FIG. 6, where X is the reference to one of the four images to be coded ($H_1$, $H_2$, $H_3$ or $L_3$). The interleaving of the images consists in creating an ordered sequence of 4 new images, termed interleaved images, which each contain one of the quadrants of the low-frequency image $L_3$. Advantageously, the quadrants are interleaved such as illustrated in FIG. 7. The interleaved image of order 1, referenced $I_1$, comprises a quadrant belonging to the image $L_3$ and three quadrants belonging to the image $H_1$, the interleaved image of order 2, referenced $I_2$, comprises a quadrant belonging to the image $L_3$ and three quadrants belonging to the image $H_2$, the interleaved image of order 3, referenced $I_3$, comprises a quadrant belonging to the image $L_3$ and three quadrants belonging to the image $H_3$, and the interleaved image of order 4, referenced $I_4$, comprises a quadrant belonging to each of the images $L_3$, $H_1$, $H_2$ and $H_3$. According to another embodiment illustrated in FIG. 8, each interleaved image contains a quadrant belonging to each of the four images arising from the temporal filtering. The quadrants can be interleaved in any other way provided that each of the four interleaved images contains a single quadrant of the low-frequency image and that the quadrants of the low-frequency image are distributed between the four interleaved images. More generally, in the case of a low-frequency image and of N high-frequency images divided into N+1 parts, these parts can be interleaved in any way provided that each of the N+1 interleaved images contains a single part of the low-frequency image and that the N+1 parts of the low-frequency image are distributed between the N+1 interleaved images. Specifically, the low-frequency image contains more information useful for the reconstruction of the sequence than the high-frequency images, i.e. its energy is greater than that of the other images. In order to improve the quality of reconstruction, it must therefore be coded in a more precise manner. By proceeding according to the invention, each quadrant of $L_3$ is coded with a bigger number of bits than if the four quadrants of $L_3$ were coded in the same image.

Figure 10:
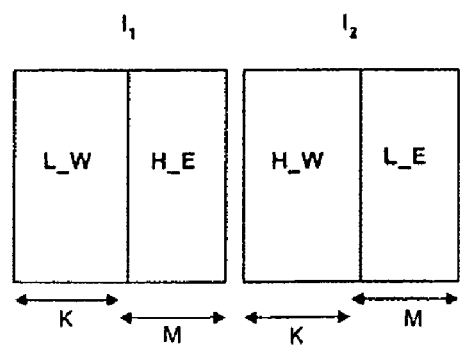
FIG. 10 illustrates an interleaving of the parts of the low-frequency and high-frequency images resulting from a temporal analysis in the case of a GOF of 2 images.

According to another embodiment, a GOP of size 2 is used such as illustrated in FIG. 4. The temporal analysis generates as previously two respectively low-frequency and high-frequency images referenced L and H. Each of the two images is then divided into two parts referenced X_W and X_E in FIG. 9, where X is the reference to one of the two images L or H. FIG. 10 represents the two images created, respectively $I_1$ of order 1 and $I_2$ of order 2, after interleaving according to a particular pattern. When the source image comprises several components the images $L_C$ and $H_C$ associated with a given component C are mutually interleaved. This step of interleaving is applied independently to each component. However, the interleaving pattern, after scaling as a function of the format of the source image, must be the same for all the components. In the case of a sequence in the 420 format, if the first interleaved image, i.e. the order 1 image, relating to the luminance component Y comprises a part of width K pixels belonging to the image $L_Y$ and a part of width M pixels belonging to the image $H_Y$, then the first interleaved image, i.e. the order 1 image, relating to a chrominance component U comprises a part of width K/2 belonging to the image $L_u$ and a part of width M/2 belonging to the image $H_u$. The same holds for the second interleaved image, i.e. the order 2 image, and for the second chrominance component V. The same procedure is applied in the case of a GOF of size greater than 2. Thus to each interleaved image of a given order relating to a given component there corresponds an interleaved image of the same order for each of the other components, the interleaved images of the same order corresponding to each of the components being interleaved according to the same pattern.

Figure 11:
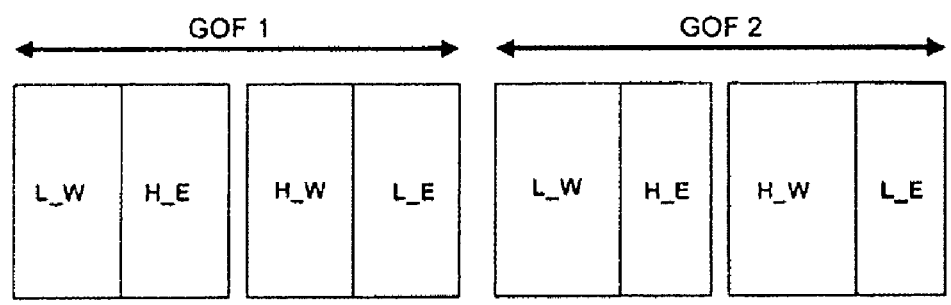
FIG. 11 illustrates a displacement of the boundary between the two image parts from GOF to GOF.
Figure 12:
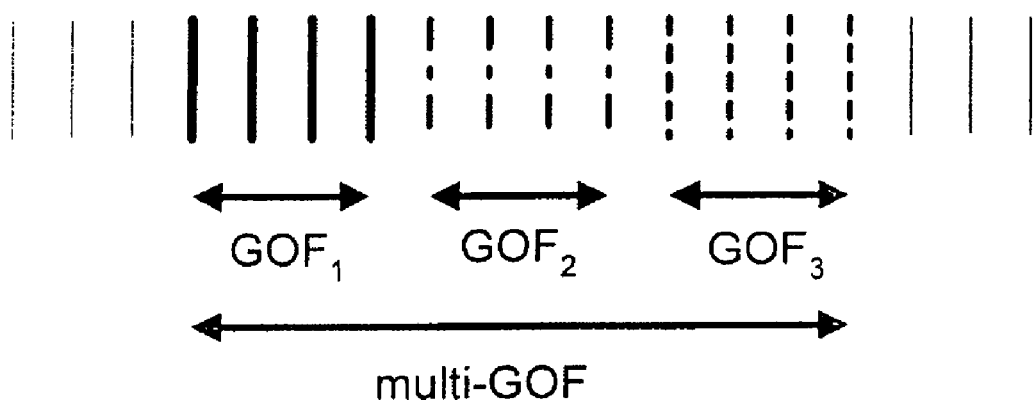
FIG. 12 illustrates a multi-GOF structure of a sequence of images.

Preferably, the boundaries between the various parts can be modified so as to decrease certain blurring effects. The position of the boundary between two image parts is modified from GOF to GOF according to a particular pattern such as illustrated in FIG. 11 for a GOF of 2 images. From an initial position, the boundary can be displaced by one or more pixels towards the right at each new GOF until a determined position then displaced by one or more pixels towards the left as far as the initial position and so on and so forth. According to another embodiment, the boundary can be displaced by a constant number of pixels towards the right inside a finite width displacement window centered on the middle column of pixels. When the current position of the boundary incremented by the constant number of pixels exits the displacement window, then it repositions itself at the start of the window. In the case of a sequence of images in the HD format, a displacement window size of 146 pixels and a constant number of 40 pixels seem very suitable for a luminance component. In the case of a 420 format, these values are divided by two for the chrominance components. Generally, for a GOF of more than 2 images, the boundaries are displaced from GOF to GOF, each of the boundaries being displaced in a given spatial direction. The process for displacing the boundary must be known by the coding and decoding methods. For this purpose, it is possible to create a multi-GOF structure which comprises a determined number of GOFs such as illustrated in FIG. 12. The sequence of source images is thus divided into multi-GOFs themselves divided into GOFs. At the start of each multi-GOF, the position of the boundary is reinitialized. According to another embodiment a synchronization signal is inserted in the data stream in a non-periodic manner. When the synchronization signal is decoded by the decoding method, the position of the boundary is then reinitialized.

Referring again to FIG. 3, during a step 17, the interleaved images relating to a given component are coded independently of one another, the same number of bits being used to code each interleaved image. Step 17 generally comprises a step 12 of spatial analysis making it possible to reduce the spatial redundancy of the images and a step 13 of entropy coding. Advantageously, the step of coding 17 is based on the JPEG2000 standard described in the document ISO/IEC 15444-1: 2002 entitled "Information Technology—JPEG 2000 image coding System" in particular using a discrete wavelet transform and a bit plane entropy coder. This method in particular makes it possible to attain a target throughput to within a bit. Advantageously, the throughput can be reduced by removing a part of the data in the headers of the binary stream generated by a coding method based on JPEG2000. For example, the information relating to the size of the image does not need to be transmitted with each image, but can be transmitted once per GOF or per multi-GOF, for example at the start. In the particular case of source images comprising several components, step 17 consists in coding independently of one another, for a given component, the interleaved images. However the corresponding interleaved images relating to all the components can be coded together, for example by a coding method based on JPEG2000. The interleaving of the low-frequency and high-frequency images in particular makes it possible to improve the quality of reconstruction after decoding and therefore the effectiveness of coding.

During a step 14, the motion vectors possibly estimated during step 11 are coded for example by a variable length coding method (VLC) or else by an entropy coding method.

During a step 15, the data relating in particular to the motion vectors and to the spatio-temporal coefficients are combined so as to create a single data stream.

Steps 11, 14 and 15 are optional. Specifically, according to the invention, the temporal filtering method might not use motion compensation.

Figure 13:
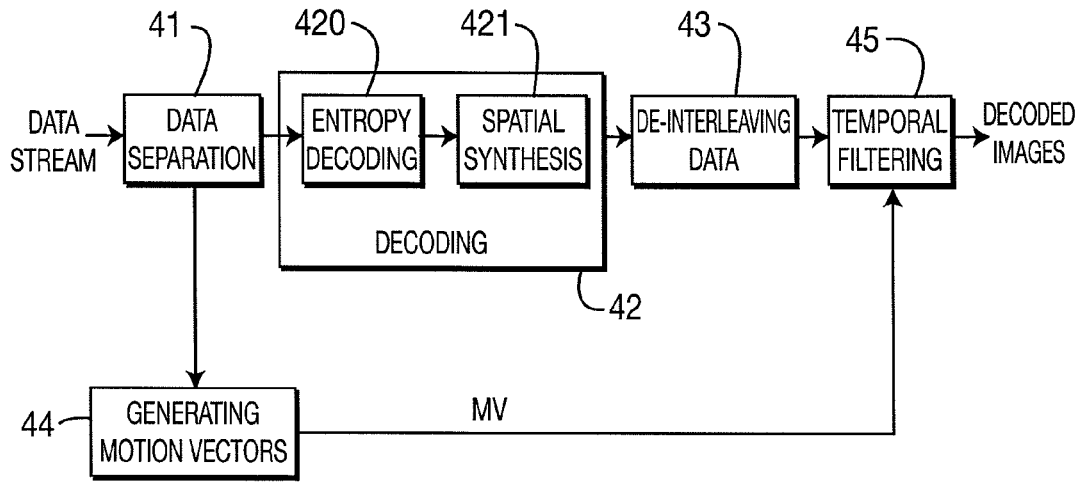
FIG. 13 illustrates a decoding method according to the invention.

The invention relates moreover to a decoding method making it possible to decode a data stream generated during the coding of a GOF of (N+1) images by the coding method according to the invention. The decoding method is illustrated by FIG. 13. Step 41 of the method makes it possible to separate in the stream the motion data and the data relating to the spatio-temporal coefficients. A step 42 makes it possible to decode that part of the data stream relating to the spatio-temporal coefficients. Generally, step 42 comprises a step 420 of entropy decoding and a step 421 of spatial synthesis. In the case where a step 17 of coding based on the JPEG2000 standard has been used by the coding method then a step of decoding 42 also based on JPEG2000 is used. This step makes it possible to generate N+1 interleaved images. The method also comprises a step 43 for de-interleaving the data so as to generate a low-frequency image and N high-frequency images. If the data stream comprises data relating to the motion then they are decoded during a step 44 for generating motion vectors. These vectors and the low-frequency and high-frequency images are used by a step 45 of temporal synthesis performing a temporal filtering so as to generate a sequence of decoded images. In the case where the source images used to generate the data stream comprise several components, step 43 generates a low-frequency image and N high-frequency images per component.

Figure 14:
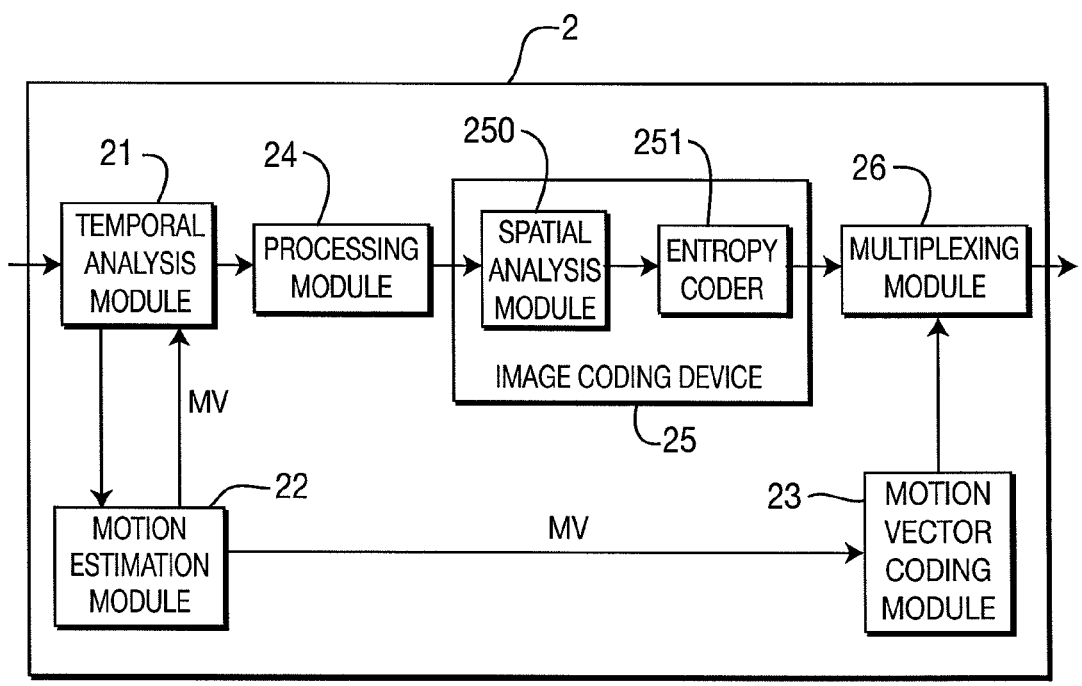
FIG. 14 illustrates a coding device according to the invention.

The invention relates furthermore to a coding device referenced 2 in FIG. 14 comprising a module 21 for temporal analysis of the sequence of source images, comprising at least one component, generating a low-frequency image and N high-frequency images for each component. This module may possibly be linked to a motion estimation module 22 which provides it with motion vectors. In this case, the coding device also comprises a module for coding the motion vectors 23. This module 23 can implement a coding process based for example on a variable length coding or an arithmetic coding. The device 2 furthermore comprises a processing module 24 which makes it possible to divide into N+1 parts the high and low-frequency images and to interleave the data relating to the latter according to the method described above so as to generate an ordered sequence of N+1 interleaved images. The device 2 also comprises at least one device for coding fixed images 25 which can itself comprise a spatial analysis module 250 and an entropy coder 251. The device 2 moreover comprises a multiplexing module making it possible to combine the data streams arising from the coding modules 23 and 25 so as to create a single data stream. The modules 22, 23 and 26 are optional. Specifically, the temporal analysis of the sequence might not use a motion compensation module. Advantageously, the device 25 for coding fixed images can be based on the JPEG2000 standard in particular using a discrete wavelet transform and a bit plane entropy coding module. According to the invention another device for coding fixed images can be used.

According to an embodiment, the device 25 makes it possible to together code the interleaved images of like order relating to the various components (for example Y, U and V) together. According to another embodiment, a coding device 25 is used to code the interleaved images relating to the luminance component Y and a second coding device 25 is used to together code the interleaved images of like order relating to the chrominance components U and V.

Figure 15:
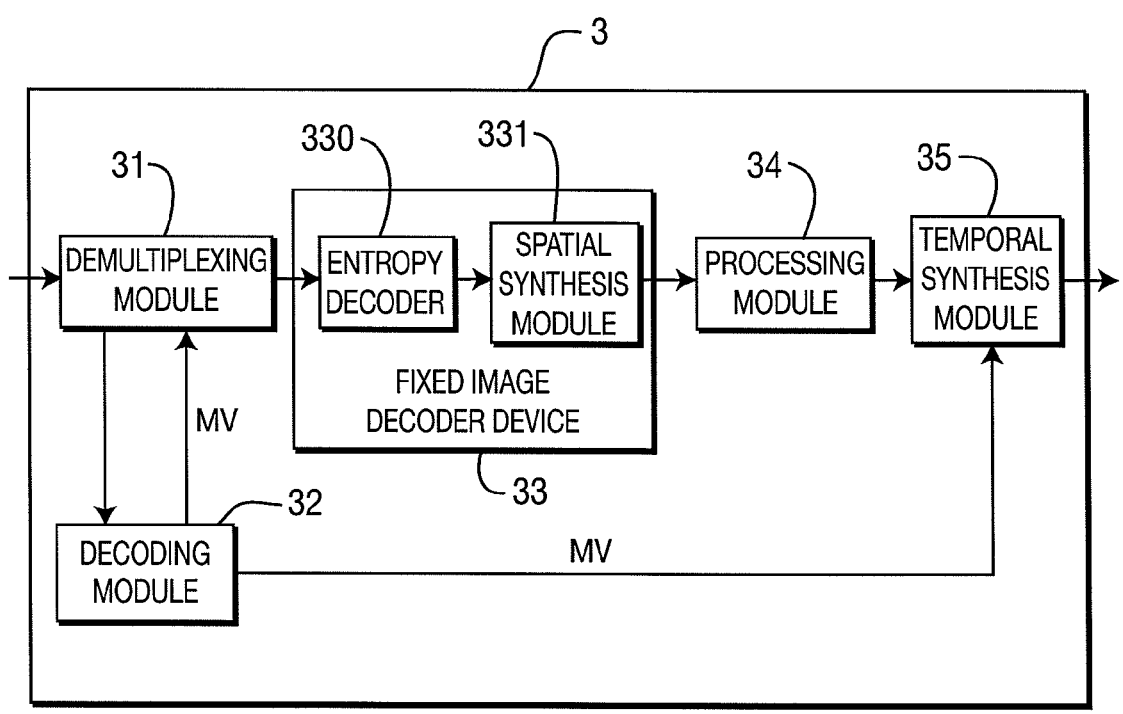
FIG. 15 illustrates a decoding device according to the invention.

The invention relates furthermore to a decoding device 3 illustrated in FIG. 15 making it possible to decode a data stream generated during the coding of a GOF of (N+1) images by the coding method according to the invention. The data stream received by device 3 is transmitted to the input of a demultiplexing module 31 making it possible to separate the data relating to the spatio-temporal coefficients and the data relating to the motion vectors. The motion data are transmitted to a module for decoding the motion 32 (for example entropy decoding device). The data relating to the spatio-temporal coefficients are thereafter transmitted to a fixed image decoding device 33 which can itself comprise an entropy decoder 330 and a spatial synthesis module 331. This device 33 carries out the inverse operations of the fixed image coding device 25 of the coder. In particular, it reconstructs the interleaved images corresponding to the various temporal frequency bands. The thus decoded interleaved images are thereafter de-interleaved by a processing module 34 so as to generate a low-frequency image and N high-frequency images. This module 34 implements the inverse process to the process implemented by the processing module 24 of the coding device 2. In the case where the source images used to generate the data stream received by the device 3 comprise several components, the processing module 34 generates a low-frequency image and N high-frequency images per component. The motion vectors decoded by the module 32 and the low- and high-frequency images arising from the module 34 are thereafter transmitted to a temporal synthesis module 35 which reconstructs the output images on the basis of temporal synthesis filters. Optionally, the temporal synthesis circuit is linked to a post-processing circuit whose output is the output of the decoder. This involves for example post-filtering making it possible to reduce defects such as block effects. In the case where the coding device associated with the device 2 does not comprise the modules 22, 23 and 26, then the device 3 does not comprise the modules 31 and 32.

Of course, the invention is not limited to the exemplary embodiments mentioned above. In particular, the person skilled in the art can introduce any variant in the embodiments set forth and combine them so as to benefit from their various advantages. The boundary between the two images L and H, in the case of a GOF of two images, can for example be horizontal instead of vertical.

An application of the invention relates in particular to wireless cameras used in the field of digital cinema.

The invention claimed is:

1. Method for coding N+1 images comprising at least one component, said method comprising a step of temporal analysis of said N+1 images generating, for each component, a low-frequency image and N high-frequency images wherein it furthermore comprises the following steps:
   dividing, for each component, each of said N+1 low-frequency and high-frequency images into N+1 parts;
   interleaving, for each component, said N+1 low-frequency and high-frequency images so as to generate a sequence of N+1 interleaved images and so that the N+1 parts of said low-frequency image are distributed between said N+1 interleaved images, each of said N+1 interleaved images comprising a single part of said low-frequency image; and
   coding, for each component, said N+1 interleaved images independently of one another, each of said interleaved images being coded with one and the same number of bits.

2. Method according to claim 1, wherein the step of coding is based on the JPEG2000 coding standard.

3. Method according to claim 1, wherein the step of temporal analysis consists of a motion-compensated temporal filtering.

4. Method according to claim 3, wherein the temporal filtering uses a filter belonging to the group of filters comprising:
   the filter of Haar type; and
   the filter of Daubechies 5-7 type.

5. Method according to claim 1, wherein said method is applied successively to at least two groups of N+1 images, each of said images being divided into N+1 parts separated by M boundaries, and wherein each of said M boundaries is displaced in a given spatial direction between said at least two groups of images.

6. Method according to claim 5, wherein N is equal to 1 and M is equal to 1.

7. Method according to claim 5, wherein at the start of each of said at least two groups of images each of said M boundaries is displaced, within a predefined displacement window, by a constant number of pixels and wherein if said boundary exits said displacement window, said boundary is displaced to a predetermined position of said displacement window.

8. Method for decoding images arising in the form of a data stream, wherein it comprises the following steps:
   decoding said stream or a part of said stream so as to generate, for each component, N+1 interleaved images;
   de-interleaving, for each component, said N+1 interleaved images so as to generate a low-frequency image and N high-frequency images; and
   performing a temporal synthesis of said N+1 low-frequency and high-frequency images so as to generate N+1 decoded images.

9. Coding device for coding N+1 images comprising at least one component, said device comprising a module for temporal analysis of said N+1 images generating, for each component, a low-frequency image and N high-frequency images, wherein it furthermore comprises:
   a processing module for dividing, for each component, each of said N+1 low-frequency and high-frequency images into N+1 parts and interleaving said N+1 low-frequency and high-frequency images so as to generate a sequence of N+1 interleaved images and so that the N+1 parts of said low-frequency image are distributed between said N+1 interleaved images, each of said N+1 interleaved images comprising a single part of said low-frequency image; and
   at least one coding module for coding, for each component, said N+1 interleaved images independently of one another, each of said interleaved images being coded with one and the same number of bits.

10. Coding device according to claim 9, wherein said at least one coding module is an image coder based on the JPEG2000 standard.

11. Decoding device for decoding images arising in the form of a data stream, wherein it comprises:
   a module for decoding said stream or a part of said stream so as to generate, for each component, N+1 interleaved images;
   a module for processing said N+1 interleaved images so as to generate a low-frequency image and N high-frequency images; and
   a module for temporal synthesis of said N+1 low-frequency and high-frequency images so as to generate N+1 decoded images.

12. Method for coding N+1 images comprising at least one component, said method comprising a step of temporal analysis of said N+1 images generating, for each component, a low-frequency image and N high-frequency images wherein it furthermore comprises the following steps:
   dividing, for each component, each of said N+1 low-frequency and high-frequency images into N+1 parts;
   interleaving, for each component, said N+1 low-frequency and high-frequency images so as to generate a sequence of N+1 interleaved images and so that the N+1 parts of said low-frequency image are distributed between said N+1 interleaved images, each of said N+1 interleaved images comprising a single part of said low-frequency image; and coding, for each component, said N+1 interleaved images independently of one another, each of said interleaved images being coded with one and the same number of bits, wherein said method is applied successively to at least two groups of N+1 images, each of said images being divided into N+1 parts separated by M boundaries, wherein at the start of each of said at least two groups of images each of said M boundaries is displaced in a given spatial direction within a predefined displacement window by a constant number of pixels and if said boundary exits said displacement window, said boundary is displaced to a predetermined position of said displacement window.

* * * * *